(No Model.)

W. B. CLARK.
LINE FASTENER.

No. 423,312. Patented Mar. 11, 1890.

WITNESSES:
William L. Miller
Edward Wolff

INVENTOR:
William B. Clark
BY
Van Santvoord & Hauff
ATTORNEYS

UNITED STATES PATENT OFFICE.

WILLIAM B. CLARK, OF NEWARK, NEW JERSEY.

LINE-FASTENER.

SPECIFICATION forming part of Letters Patent No. 423,312, dated March 11, 1890.

Application filed October 24, 1889. Serial No. 328,081. (No model.)

*To all whom it may concern:*

Be it known that I, WILLIAM B. CLARK, a citizen of the United States, residing at Newark, in the county of Essex and State of New Jersey, have invented new and useful Improvements in Line-Fasteners, of which the following is a specification.

This invention relates to fasteners for clothes-lines, whereby the ends of the line can be drawn up and fastened independently of each other.

The construction and operation of the device are described in the following specification, reference being had to the accompanying drawings, in which—

Figure 1:
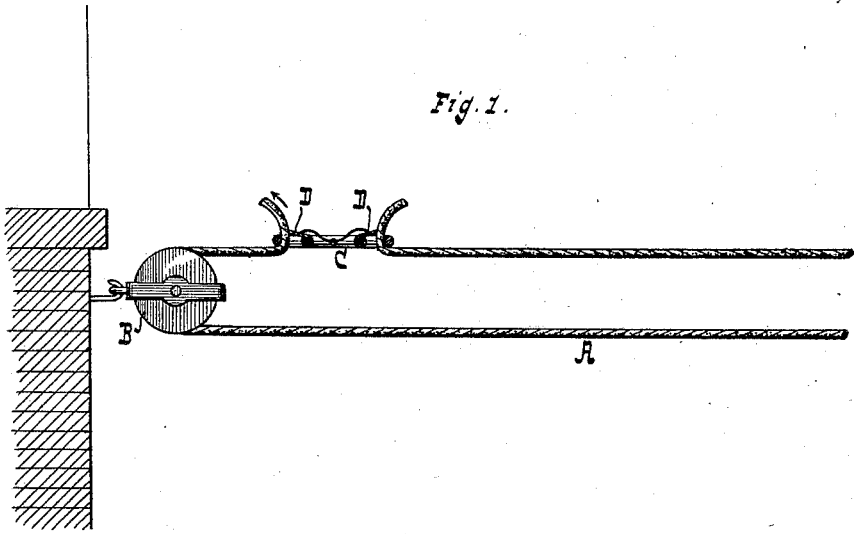
Figure 2:
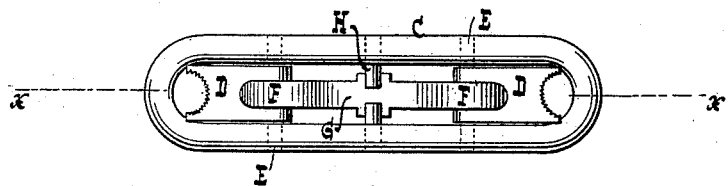
Figure 3:

Figure 1 represents the fastener applied to a clothes-line, the fastener in this figure being shown in longitudinal section on the line $x\ x$ of Fig. 2. Fig. 2 is a plan view of the fastener. Fig. 3 is a sectional view, the section being taken on the line $x\ x$ of Fig. 2.

Similar letters indicate corresponding parts.

The letter A designates a clothes-line, which is passed around pulleys suspended from the wall of a house or from a post or other convenient place. Only one of the pulleys B is here shown, the other being out of view in the drawings, but it is supposed to receive around it the part of the line which is out of view. The ends of the strands of the line pass through the fastener and are adjusted and fastened therein, as hereinafter explained.

The fastener consists of an oblong hollow frame C, within which, near its ends, are placed swinging jaws or dogs D D, which swing on pivots E E, that extend through the sides of the frame, as shown in the drawings. The dogs are arranged in such manner that they cannot pass through the frame, but their free ends come against and rest upon one side of the frame, as shown in the drawings. The ends of the dogs are corrugated or roughened, so that the line will not slip under them when interposed between the frame and the dogs, and in the example shown in Fig. 2 their ends are made concave, so as to conform to the shape of the line. The dogs are held in place on the frame by springs F F, whose ends rest on the outer sides of the dogs. As shown in the several figures, the springs are formed from a single spring-plate G, which is fastened within the frame at the middle of the length of said plate by means of pins H H, which extend through the sides of the frame and are slotted at their inner ends, so as to receive the edges of the spring-plate in their slots.

The dogs D D are pivoted, respectively, at opposite ends of the frame C by separate and independent pivot-pins E E, located in the same horizontal plane, and the dogs effect their clamping action in reverse directions against one side of the frame to adjustably clamp and connect the free ends of a line. In these respects my invention differs from prior devices having a pair of clamping-dogs for holding two ropes.

The operation of the device is as follows: The ends of the line are passed through the ends of the frame under the teeth of the dogs. If in consequence of the load of clothes on the line, or from any other cause, the line is too slack, the slack is taken up by drawing the line by one of its ends through the frame in the direction of the arrow, (see Fig. 1,) and on releasing the line the dog D, under which the line passes, is drawn by means of the frictional contact between the line and the dog in the reverse direction, so that the line is clamped and fastened between the dog and the adjacent end of the frame. The strain on the line serves also to clamp the dog at the other end of the frame against the other end of the line, which passes under it. Thus the dogs engage the ends of the line and crowd it against the ends of the frame with a clamp-like action, constituting a self-acting fastener, which is tightened in proportion to the strain on the line in the opposite direction.

It is obvious that either end or branch of the line can be drawn up and fastened independently of the other, and that the dogs can be operated independently of each other.

What I claim as new, and desire to secure by Letters Patent, is—

The herein-described clothes-line fastener, consisting of the oblong hollow frame C, the independent dogs D, pivoted in opposite ends of said frame, the pins H, extended through opposite sides of said frame at its center and provided with slotted inner ends, and the spring-plate G, supported in the slotted ends of the pins H and provided at its ends with springs F, adapted to bear on the pivoted dogs, substantially as shown and described.

In testimony whereof I have hereunto set my hand in the presence of two subscribing witnesses.

WILLIAM B. CLARK.

Witnesses:
J. VAN SANTVOORD,
E. F. KASTENHUBER.